United States Patent [19]

Purpora

[11] Patent Number: 5,031,447

[45] Date of Patent: Jul. 16, 1991

[54] STANDPIPE LEVELER FOR HYDROSTATIC PRESSURE TANK TESTER

[76] Inventor: William J. Purpora, 5541 N. Kent Ave., Whitefish Bay, Wis. 53217

[21] Appl. No.: 482,094

[22] Filed: Feb. 15, 1990

[51] Int. Cl.⁵ .............................................. G01M 3/32
[52] U.S. Cl. .......................................... 73/49.2; 73/302
[58] Field of Search ........................ 73/49.2, 302, 299

[56] References Cited
U.S. PATENT DOCUMENTS 3,580,055  5/1971  White ................................ 73/49.2
4,807,464  2/1989  Janotta ............................... 73/49.2

FOREIGN PATENT DOCUMENTS 2511268  9/1975  Fed. Rep. of Germany ....... 73/49.2

Primary Examiner—Hezron E. Williams
Assistant Examiner—Joseph W. Roskos
Attorney, Agent, or Firm—Andrus, Sceales, Starke & Sawall

[57] ABSTRACT

A standpipe leveler is suitable for use with the standpipe of a tank tester that is elevated to produce hydrostatic pressure on the tank. The leveler includes a graduate container for receiving liquid discharged from ports in the standpipe. The graduate container is connected to the inlet of a pump. The outlet of the pump is connected to the base of the standpipe for supplying liquid to the standpipe. A reservoir container may also be connected to the inlet of the pump and a drain or sump connected to the outlet of the pump. The graduate container may be located at a convenient level for the technician carrying out the hydrostatic pressure test to observe reduction of the liquid level in the graduate container due to leakage from the tank.

8 Claims, 2 Drawing Sheets

STANDPIPE LEVELER FOR HYDROSTATIC PRESSURE TANK TESTER

It is periodically necessary to test underground storage tanks, such as those used for the bulk storage of fuels or other liquids, for leakage. This is commonly done by placing the contents of the tank under hydrostatic pressure and noting if, or how much, fluid loss occurs over a predetermined period of time.

The hydrostatic pressure is usually created by establishing a liquid head of predetermined height on the contents of the tank. A liquid conduit has one end connected to the tank and the other end connected to a standpipe. The conduit and standpipe are filled with liquid and raised or lowered to establish the desired pressure head. The standpipe is of glass or plastic, or has a gauge, so that liquid levels in the standpipe can be read.

In the simplest form of a pressure test, the standpipe would be raised to the height necessary to establish the desired pressure head and the liquid level in the standpipe observed to see if any losses occur over the given period of time.

In actuality, however, pressure testing of underground storage tanks is somewhat more sophisticated. It is typically desired to create a pressure in the tank that is greater by some predetermined amount over the external pressure to which the tank is subjected. A typical pressure differential is 4 psi. This represents a nominal height of approximately 9 feet for water or approximately 12 feet for gasoline. If the soil in which the tank is buried is dry, the external pressure on the tank is low and the height to which the standpipe must be raised is close to the nominal height.

However, if the soil contains considerable amounts of water, the standpipe must be raised to a greater height in order to establish the desired pressure differential. The height to which the standpipe must be raised often makes it difficult for the technician carrying out the test to observe the liquid in the standpipe to see whether level decreases indicative of tank leakage are occurring.

Also, it is necessary to eliminate, insofar as is possible, changes in liquid levels due to factors other than leakage since these tend to obscure test results. One such factor is deflection in the tank due to the hydrostatic pressure.

To eliminate changes in liquid levels due to tank deflection, a hydrostatic pressure may be initially applied to the tank that is greater than the pressure applied during the measurement phase of the test. The greater hydrostatic pressure is sufficient to initiate any deflection that will occur in the tank and to thus stabilize the tank. Thereafter, the hydrostatic pressure is reduced to carry out the measurement phase of the test.

For example, two hydrostatic pressure levels, 30 inches apart, may be established. The high level is used to stabilize the condition of the tank. For this purpose, the technician maintains the high level in the standpipe for a predetermined period of time by adding or drawing off liquid.

Thereafter, the low level in the standpipe is used for measurement purposes.

However, if the standpipe is greatly elevated to obtain the necessary pressure differential in wet soil, it is, again, difficult and awkward for the technician to maintain the discrete levels in the standpipe. This increases the time and effort required to perform the leakage test and may introduce inaccuracies into the results.

It is, therefore, the object of the present invention to provide an improved standpipe leveler for maintaining desired liquid levels in the standpipe of a hydrostatic pressure tank tester. The standpipe leveler of the present invention avoids the need for the technician to climb to the elevated level of the standpipe in order to maintain or observe liquid levels.

Briefly, the standpipe leveler of the present invention is suitable for connection to a standpipe that can be coupled by a conduit to the tank to be tested. The standpipe has a lower port and an upper port for establishing discrete liquid levels within the standpipe. A drain collects liquid discharged from the ports. A valve is located in the lower port to permit liquid to rise to the level established by the upper port when the valve is closed.

A graduate container has an inlet connected to the standpipe drain. An outlet of the graduate container is connected through to an inlet of a pump. An outlet of the pump is connected to the base of the standpipe for supplying liquid to the standpipe. Another inlet of the pump may be connected to a liquid reservoir. Another outlet of the pump can be connected to a sump. Appropriate valving is provided in the pump inlet and outlets.

In use, the pump recirculates the liquid discharged from the standpipe and collected in the graduate container to maintain the liquid level in the standpipe. The graduate container may be placed at a location convenient to the technician conducting the test. To establish the high liquid level necessary to stabilize the tank, the valve in the lower port is closed. Thereafter, the valve is opened and the liquid level drops to the low level and is maintained at that level by the liquid recirculated by the pump.

Liquid losses due to leakage from the storage tank are identified by the progressive reduction of the liquid level in the graduate container. In the event of excessive liquid losses, additional liquid may be drawn from a reservoir container connected to the inlet of the pump to maintain the liquid level in the standpipe. If excessive fluid collects in the standpipe leveler, the excess fluid may be discharged to the sump from the outlet of the pump.

The invention is further described in the detailed description below and in the accompanying drawings.

Figure 1:
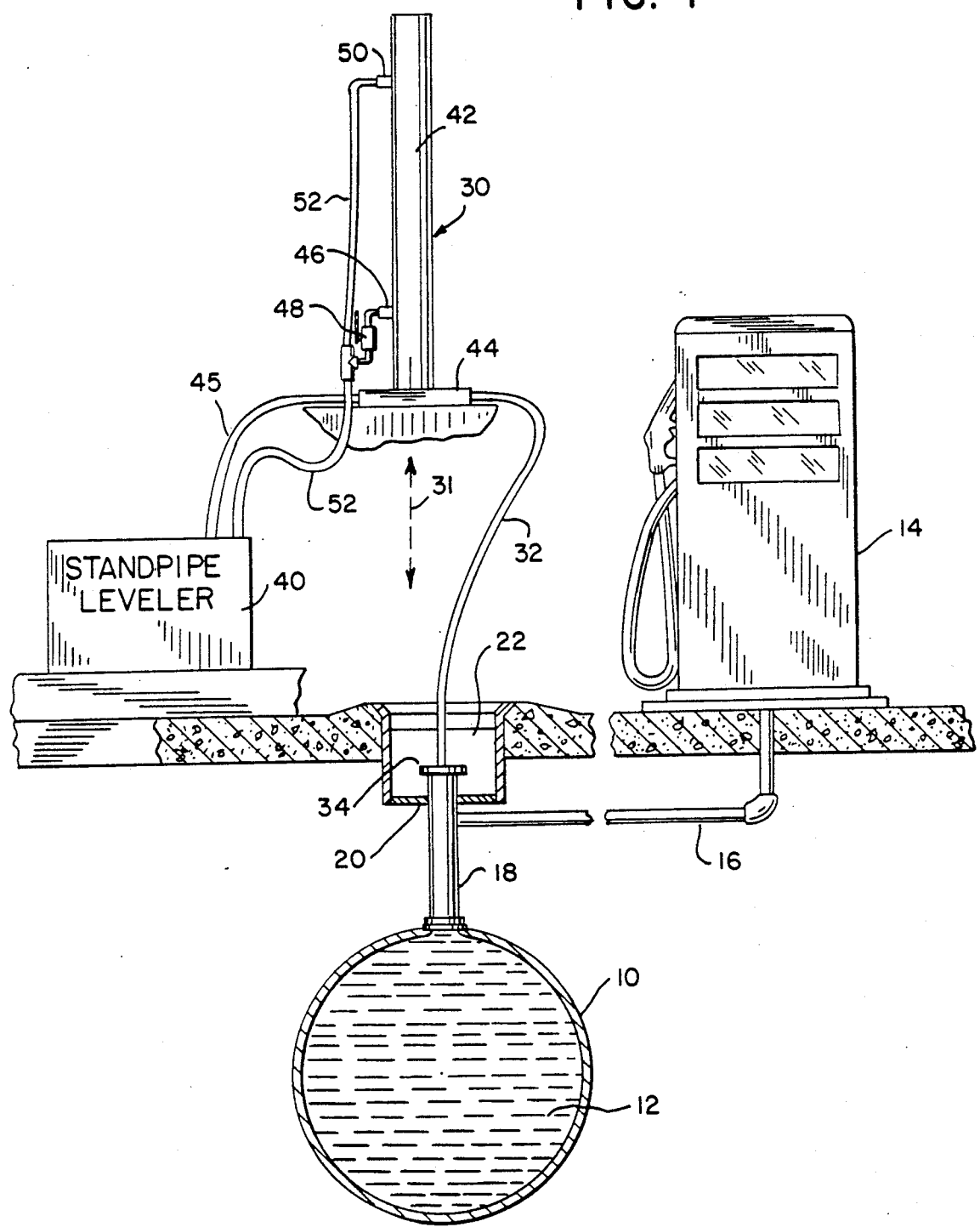
FIG. 1 is a view of an underground storage tank, a standpipe and the leveler of the present invention.

In FIG. 1, the numeral 10 indicates a storage tank for liquid 12, such as fuel. Tank 10 is mounted underground. Tank 10 supplies fuel to dispenser 14 by means of delivery line 16. A motor driven pump, not shown, may be provided to draw fuel from tank 10 through a riser, also not shown, and discharge same into delivery line 16.

Access is obtained to tank 10 through pipe 18. Pipe 18 may be a fill line, vent, or pump connection to the tank. The upper end of pipe 18 is located in manhole 20 in the surface of the ground in which tank 10 is buried or in the pavement covering the ground. A removable cover is provided to the manhole.

Figure 2:
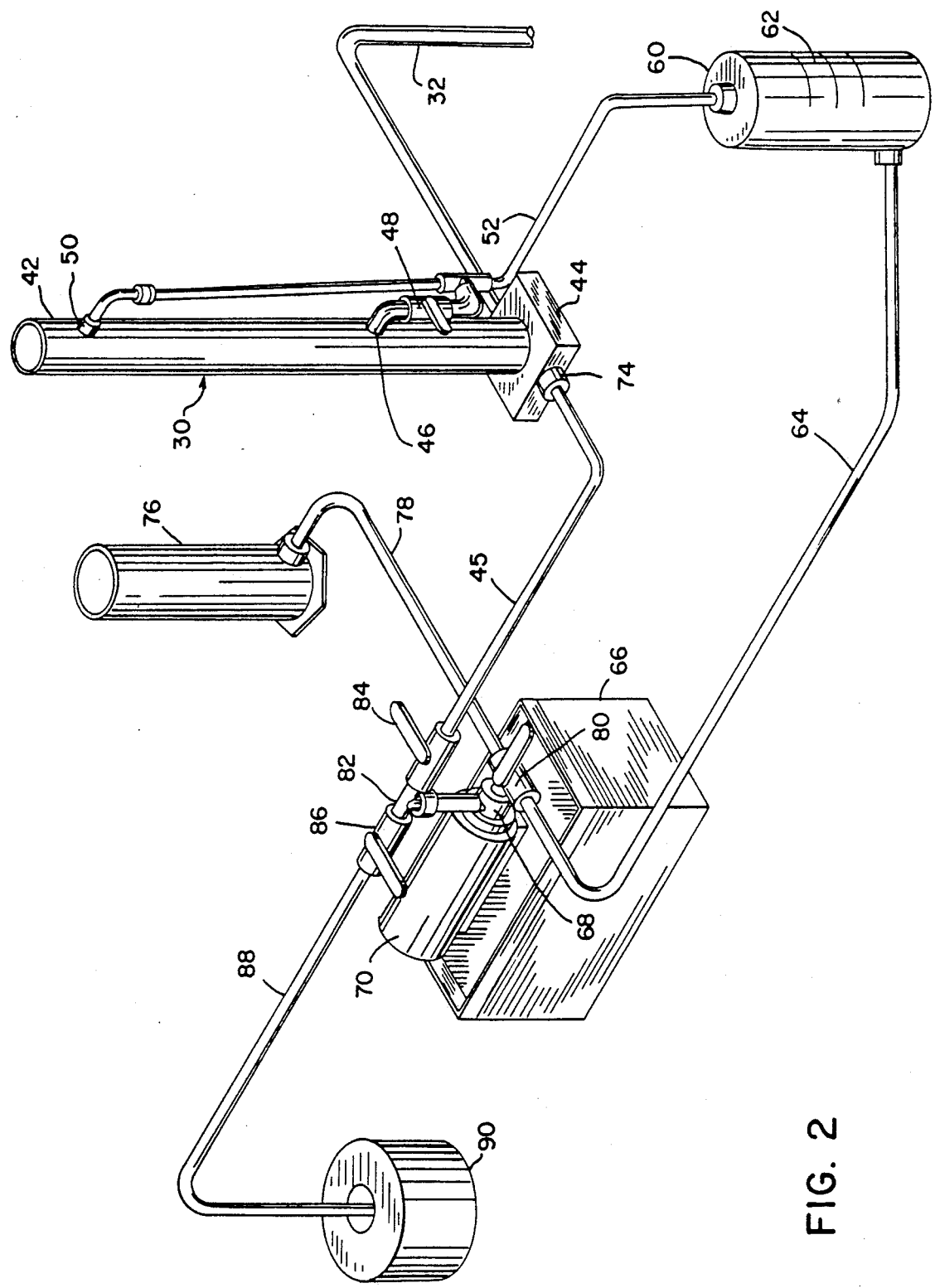
FIG. 2 is a detailed diagram of the standpipe leveler of the present invention.

To test the integrity of underground bulk storage tank 10, standpipe 30 is connected via conduit 32 to tank 10. For this purpose, the lower end of conduit 32 may extend through a sealing fitting 34 at the top of pipe 18 into the pipe or tank 10. Standpipe 30 is filled with liquid and is raised, or lowered, as indicated by arrow 31. Standpipe 30 is positioned at a height sufficient to establish the desired pressure head on the contents of tank 10. Standpipe 30 is also connected to standpipe leveler 40, shown in detail in FIG. 2.

Standpipe 30 typically comprises a vertically oriented tubular member 42 mounted on base 44. Base 44 contains an outlet connected to conduit 32. Base 44 also contains an inlet by which liquid may be supplied to standpipe 30 via conduit 45.

It is desired to establish one or more discrete levels within tubular member 42. In a typical embodiment of the apparatus of the present invention, a high level and a low level are established. These are spaced apart a desired vertical distance, such as 30 inches. For this purpose, tubular member 42 contains lower port 46. Lower port 46 is positioned a predetermined distance, such as 12 inches, above base 44. Lower port 46 contains valve 48.

Tubular member 42 also contains upper port 50. Upper port 50 and lower port 46-valve 48 are connected by return conduit 52, which is further connected to standpipe leveler 40 in the manner shown in greater detail in FIG. 2.

Return conduit 52 is connected to the inlet of graduate container 60. Graduate container 60 contains graduations 62 indicating the quantity of liquid in the container. In a typical embodiment of the standpipe leveler of the present invention, graduate container 60 will comprise a generally tubular member having a capacity of approximately one gallon. Graduate container 60 has an outlet in the bottom portion thereof connected to conduit 64. Conduit 64 is connected to an inlet of pump unit 66. Pump unit 66 includes pump 68 driven by motor 70. Pump 68 is preferably of the continuous duty type and may comprise a centrifugal pump, diaphragm pump, positive displacement pump with adjustable bypass, or other suitable pump. In view of the flammable nature of the liquids with which the present invention is typically used, motor 70 and the associated controls are preferably of the explosion proof type.

An outlet of pump 68 is connected to conduit 45 that extends from the pump to an inlet port 74 in base 44 of standpipe 30. Inlet port 74 may contain a check valve to prevent flow out of standpipe 30.

The inlet of pump 68 may also be connected to liquid reservoir 76, via conduit 78. For this purpose, the inlet of pump 68 includes tee fitting 80 containing a flow selector that connects one of conduits 64 or 78 to the inlet of pump 68.

The outlet of pump 68 may include tee fitting 82. Tee fitting 82 is connected through valve 84 to conduit 45. Tee fitting 82 is connected through valve 86 to conduit 88 leading to sump or drain container 90.

The operation of standpipe leveler 40 is as follows. Standpipe 30 is connected to tank 10 by coupling one end of conduit 32 to the outlet in base 44 and the other end to tank 10 by means of fitting 34. Standpipe leveler 40 is connected to standpipe 30 by conduits 52 and 45.

Standpipe 30 is then raised to a level that will provide the necessary pressure differential over that applied by the soil surrounding tank 10. Graduate container 62 may be placed in any position at which it can be conveniently read by the technician conducting the test.

Valve 48 at lower port 46 is closed. Standpipe 30 is then filled with liquid. This may be accomplished by pouring liquid into the top of the standpipe. Preferably, and in accordance with the present invention, pump 68 is used for this purpose. Specifically, flow director 80 is operated to connect conduit 78 and reservoir 76 to the inlet of pump 68. Valve 84 at the outlet of pump 68 is opened to connect pump 68 to inlet 74 of standpipe 30 via conduit 45. Valve 86 is closed. Pump 68 is then operated to pump liquid from reservoir 76 through conduit 45 to standpipe 30. Liquid will flow out of standpipe 30 into conduit 32 so that any remaining volume of tank 10 and conduit 32 are filled with liquid.

When tank 10 has been completely filled, conduit 32 has been filled, and standpipe 30 has been filled to the level of upper port 50, a hydrostatic pressure, determined by the height of upper port 50, will be applied to tank 10. As pump 68 continues to operate, liquid will spill over from standpipe 30 into return conduit 52 as pump 68 continues to operate. The fluid discharged from port 50 will collect in graduate container 62. When graduate container 62 has been filled to a desirable level, such as the midpoint, flow selector 80 is operated to connect conduit 64 to the inlet of pump 68. Pump 68 thus circulates liquid discharged in conduit 52 back to standpipe 30.

By the overflow action at port 50, the liquid level is maintained at the level of upper port 50. The hydrostatic pressure on tank 10, so established, is sufficiently high as to initiate any deflections of the tank that are likely to occur during the test. In a tubular tank, such deflections would normally occur at the ends or "heads" of the tank.

Should such deflections occur, the level in graduate container 62 will drop as liquid is supplied through conduit 32 to tank 10 to occupy the volume created by the deflection of the tank. Air bubbles or other anomalies in the tank will provide similar losses of liquid. Changes in the temperature of the liquid in tank 10 will also cause corresponding variations in the volume of the contents of the tank and in the liquid level noted in graduate container 62. Temperature changes in tank 10 may be minimized by use of a circulating pump that renders the temperature relatively uniform throughout the volume of the liquid.

The technician may note and record volumetric trends observed in graduate container 62 during the time the high pressure is applied to tank 10 as an aid to interpreting the test results.

It will be appreciated that through the use of standpipe leveler 40, it is not necessary for the technician to ascend to the elevated level of standpipe 30 itself in order to maintain the level in standpipe 30 at that established by overflow 50 during the time the high pressure is applied to tank 10.

After tank 10 has been subjected to the high hydrostatic pressure established by overflow port 50 and standpipe 30 for a predetermined period of time sufficient to stabilize the condition of tank 10, valve 48 is opened. This reduces the liquid level in standpipe 30 to that established by overflow port 46. The hydrostatic pressure on the contents of tank 10 is correspondingly reduced. The level of the liquid in graduate container 62 rises by the volume of the contents of standpipe 30 existing between overflow port 50 and overflow port 46.

Standpipe leveler 40 operates in a similar manner to that described above to maintain the level of the liquid in standpipe 30 at that established by lower overflow port 46. That is, as pump 68 continues to operate, liquid will overflow from lower port 46 to maintain the level. The pump recirculates the liquid back to standpipe 30.

The lower hydrostatic pressure established by the liquid in standpipe 30 at the level of overflow port 46 is utilized during the measurement phase of the hydrostatic pressure test. At this lower hydrostatic pressure, any losses of fluid will be due to leakage, and not to tank deflection, or the like. Such losses from tank 10 during the time period of the low pressure test, will cause a corresponding reduction in the liquid level in graduate container 62. This level reduction is quantitatively noted and recorded by the technician to be used in establishing the integrity condition of the tank.

Should conditions in the tank or standpipe apparatus when valve 48 is in either the open or closed position cause an undue drop in the level of liquid in graduate container 62, flow selector 80 may be operated to draw additional fluid from reservoir 76. Should conditions cause the liquid levels in graduate container 62 to unduly increase, valve 84 may be closed and valve 86 opened to discharge excess fluid through conduit 88 to waste container 90.

From the foregoing, it will be appreciated that the standpipe leveler of the present invention provides a means for continuously maintaining desired liquid levels in elevated standpipe 30, while at the same time permitting liquid losses, or volumetric increases to be noted in graduate container 62 which may be placed at a position convenient to the technician conducting the test.

I claim:

1. A standpipe leveler suitable for use with a standpipe having a lower port and an upper port vertically spaced from the lower port, and valve means for controlling the discharge of liquid from the lower port, said leveler comprising:

a container having means for indicating the volume of liquid contained therein, said container having an inlet connected to said parts of the standpipe and an outlet; and pump means having liquid intake means and liquid discharge means, said liquid intake means being connected to said outlet of said container for receiving liquid therefrom, said liquid discharge means being connected to the standpipe for supplying liquid thereto for maintaining liquid levels in the standpipe.

2. The standpipe leveler according to claim 1 wherein said leveler further includes return means for collecting liquid discharged from the ports of the standpipe and supplying same to said inlet of said container, conduit means for connecting the outlet of said container to said liquid intake means of said pump means, and supply conduit means for connecting said liquid discharge means of said pump means to a lower portion of the standpipe.

3. The standpipe leveler according to claim 1 further including liquid reservoir means connected to said liquid intake means of said pump means for supplying liquid to said pump means, said liquid intake means having valve means for selectively connecting one or the other of said container or reservoir means to said liquid intake means.

4. The standpipe leveler according to claim 1 further including drain means connected to said liquid discharge means, said liquid discharge means having valve means for supplying the discharge of said pump means to the standpipe or said drain means.

5. The standpipe leveler according to claim 1 wherein said pump means comprises centrifugal pump means.

6. The standpipe leveler according to claim 1 wherein said pump means comprises diaphragm pump means.

7. The standpipe leveler according to claim 1 wherein said pump means comprises positive displacement pump means having adjustable bypass means.

8. The standpipe leveler according to claim 1 further including as an element of the claimed combination said standpipe.

* * * * *